(12) United States Patent
Tyler et al.

(10) Patent No.: US 9,234,091 B2
(45) Date of Patent: Jan. 12, 2016

(54) LIQUID CRYSTALLINE COMPOSITION HAVING A PEARLY LUSTER

(71) Applicant: Ticona LLC, Florence, KY (US)

(72) Inventors: Mark Allen Tyler, Florence, KY (US); Bruce Michael Mulholland, Hebron, KY (US)

(73) Assignee: Ticona LLC, Florence, KY (US)

( * ) Notice: Subject to any disclaimer, the term of this patent is extended or adjusted under 35 U.S.C. 154(b) by 0 days.

(21) Appl. No.: 14/527,806

(22) Filed: Oct. 30, 2014

(65) Prior Publication Data

US 2015/0210836 A1 Jul. 30, 2015

Related U.S. Application Data

(60) Provisional application No. 61/918,100, filed on Dec. 19, 2013.

(51) Int. Cl.
| | |
|---|---|
| *C08G 64/02* | (2006.01) |
| *C08K 9/02* | (2006.01) |
| *C09K 19/38* | (2006.01) |
| *C08G 63/00* | (2006.01) |
| *C09K 19/52* | (2006.01) |

(52) U.S. Cl.
CPC ............... *C08K 9/02* (2013.01); *C09K 19/3809* (2013.01); *C09K 2019/521* (2013.01)

(58) Field of Classification Search
USPC .......... 523/100; 428/325, 331, 375, 411, 412, 428/146; 528/176, 271, 272
See application file for complete search history.

(56) References Cited

U.S. PATENT DOCUMENTS

| | | |
|---|---|---|
| 4,065,655 A | 12/1977 | Wong et al. |
| 4,161,470 A | 7/1979 | Calundann |
| 4,626,557 A | 12/1986 | Duska et al. |
| 5,492,946 A | 2/1996 | Huspeni et al. |
| 5,616,680 A | 4/1997 | Linstid, III |
| 6,114,492 A | 9/2000 | Linstid, III et al. |
| 6,121,369 A | 9/2000 | Stack et al. |
| 6,407,149 B1 | 6/2002 | McCullough |
| 6,514,611 B1 | 2/2003 | Shepherd et al. |
| 6,572,784 B1* | 6/2003 | Coombs et al. .......... 252/301.16 |
| 6,755,991 B2 | 6/2004 | Kometani et al. |
| 6,758,989 B2 | 7/2004 | Miyashita et al. |
| 7,449,239 B2 | 11/2008 | Seeger et al. |
| 7,578,950 B2 | 8/2009 | Kirchner et al. |
| 7,709,568 B2 | 5/2010 | Bersted et al. |
| 7,985,351 B2 | 7/2011 | Yamauchi et al. |
| 7,989,531 B2 | 8/2011 | Bersted et al. |
| 8,142,683 B2 | 3/2012 | Murouchi et al. |
| 8,192,645 B2 | 6/2012 | Murouchi et al. |
| 8,658,057 B2 | 2/2014 | Nakayama et al. |
| 8,834,741 B2 | 9/2014 | Shiraishi et al. |
| 2004/0235998 A1 | 11/2004 | Kirchner |
| 2007/0057236 A1 | 3/2007 | Hosoda et al. |
| 2008/0022898 A1* | 1/2008 | Sudo et al. ............... 106/287.25 |
| 2008/0152927 A1* | 6/2008 | Noguchi et al. .......... 428/423.1 |
| 2011/0189454 A1 | 8/2011 | Fukuhara et al. |
| 2014/0011011 A1 | 1/2014 | Fujino et al. |
| 2014/0171576 A1 | 6/2014 | Mulholland |

FOREIGN PATENT DOCUMENTS

| | | |
|---|---|---|
| EP | 1 810 757 A1 | 7/2007 |
| EP | 2 074 886 A2 | 7/2009 |
| GB | 2 328 436 A | 2/1999 |
| GB | 2 455 872 A | 6/2009 |
| JP | 2004267983 * | 9/2004 |
| WO | WO 2004005425 A1 | 1/2004 |
| WO | WO 2004022669 A1 | 3/2004 |
| WO | WO 2004058851 A1 | 7/2004 |
| WO | WO 2004055252 A1 | 4/2014 |

OTHER PUBLICATIONS

Abstract of Japanese Publication—JPH06248165, Sep. 6, 1994, 1 page.
Abstract of Japanese Publication—JPH07196894, Aug. 1, 1995, 1 page.
Abstract of Japanese Publication—JP2001279066, Oct. 10, 2008, 1 page.
Abstract of Japanese Publication—JP2008247985, Oct. 16, 2008, 1 page.
Abstract of International Publication No. WO2013066003, May 10, 2013, 1 page.
Material Safety Data Sheet on Black Pearls® 120 from Cabot Corporation, Jul. 11, 2011 15 pages.
Product Information from Cabot Corporation on Black Pearls® 4350 and Black Pearls 4750: High Purity Furnace Blacks for FDA Applications, 2004, 4 pages.
Product Information from Cabot Corporation on Black Pearls® 4750, Sep. 2004, 2 pages.
Product Information from Cabot Corporation—Color Measurement for Carbon Black Filled Plastics, 6 pages.
Zenite® Product Offering from Celanese Corporation, 1 page.
International Search Report and Written Opinion for PCT/US2014/062908 dated Feb. 3, 2015, 11 pages.

* cited by examiner

*Primary Examiner* — Terressa Boykin
(74) *Attorney, Agent, or Firm* — Dority & Manning, P.A.

(57) ABSTRACT

A polymer composition that contains a liquid crystalline polymer and a pearlescent filler is provided. By selectively controlling the type and relative concentration of these components, the polymer composition and shaped parts formed therefrom can be achieved that have a pearly luster appearance similar to parts plated with metals, such as copper, brass, or bronze.

20 Claims, 3 Drawing Sheets

LIQUID CRYSTALLINE COMPOSITION HAVING A PEARLY LUSTER

RELATED APPLICATIONS

The present application claims priority to U.S. Provisional Application Ser. No. 61/918,100, filed on Dec. 19, 2013, which is incorporated herein in its entirety by reference thereto.

BACKGROUND OF THE INVENTION

Foodstuff articles (e.g., cookware and bakeware) are often formed from metals, such as copper, bronze, brass, etc. Although strong and very conductive, metal foodstuff articles tend to be relatively heavy, corrosive, and can produce loud and noisy sounds when handled. In light of the above, various attempts have been made to use high performance polymers, such as thermotropic liquid crystalline polymers, to manufacture some types of foodstuff articles due to their excellent chemical resistance and thermal properties. One of the difficulties with these polymers, however, is that their color is not readily altered by conventional means. This is particularly problematic for foodstuff articles in which a lustrous appearance is often desired. As such, a need currently exists for a liquid crystalline polymer composition that has a lustrous appearance for use in foodstuff articles.

SUMMARY OF THE INVENTION

In accordance with one embodiment of the present invention, a liquid crystalline polymer having a pearly luster is disclosed. The polymer composition comprises a liquid crystalline polymer and pearlescent filler, wherein the pearlescent filler includes flake-shaped silicate mineral particles coated with a metal oxide layer.

Other features and aspects of the present invention are set forth in greater detail below.

BRIEF DESCRIPTION OF THE FIGURES

A full and enabling disclosure of the present invention, including the best mode thereof to one skilled in the art, is set forth more particularly in the remainder of the specification, including reference to the accompanying figures, in which.

DETAILED DESCRIPTION

Figure 1:
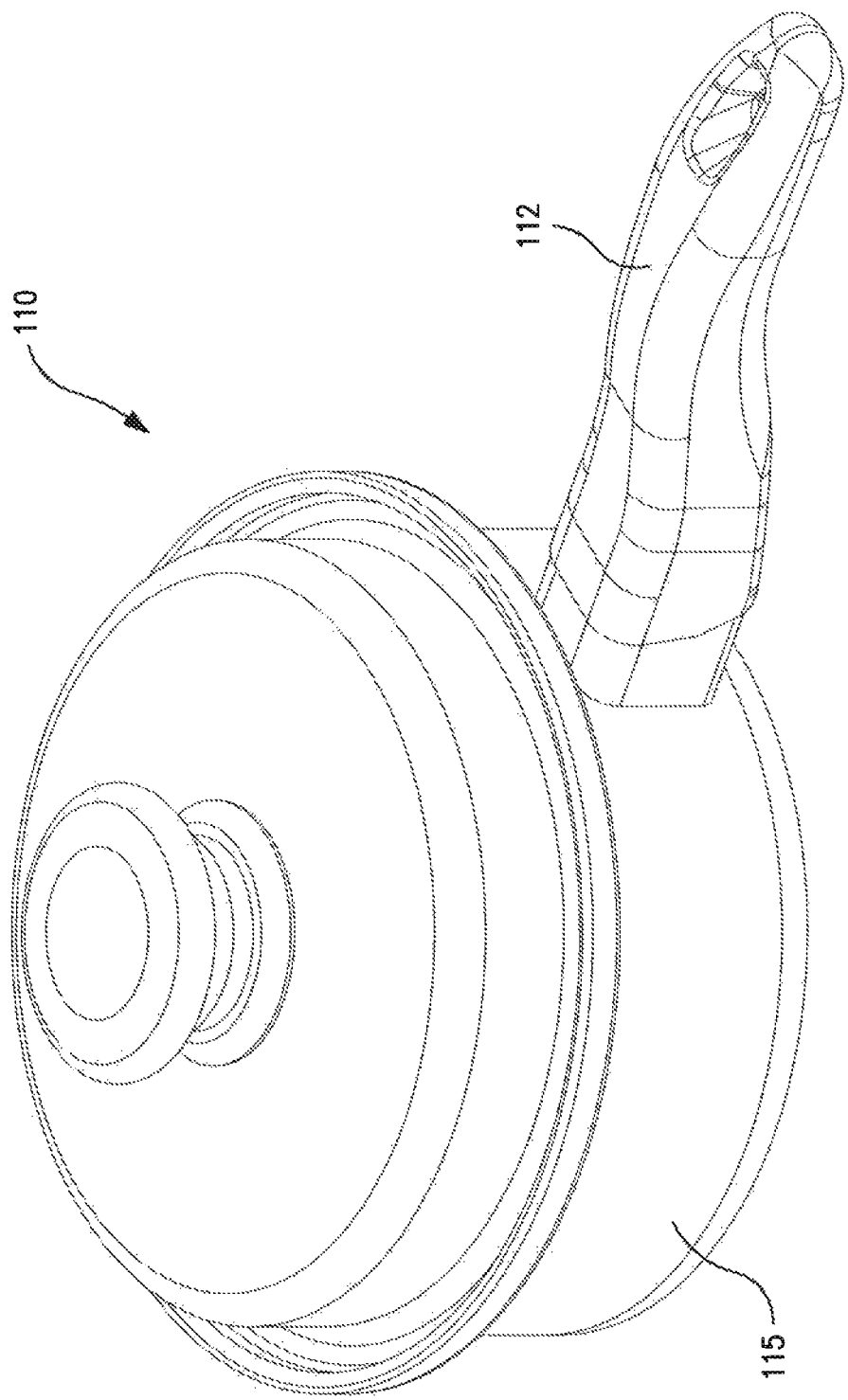
FIG. 1 is a perspective view of one embodiment of a foodstuff article in the form of a saucepan, all or a portion of which may be formed from the polymer composition of the present invention.

It is to be understood by one of ordinary skill in the art that the present discussion is a description of exemplary embodiments only, and is not intended as limiting the broader aspects of the present invention.

Generally speaking, the present invention is directed to a polymer composition that contains a liquid crystalline polymer and a pearlescent filler. By selectively controlling the type and relative concentration of these components, the polymer composition and shaped parts formed therefrom can have a pearly luster appearance similar to parts plated with metals, such as copper, brass, or bronze. These compositions are particularly useful in "foodstuff articles." As used herein, the term "foodstuff" generally refers to a substance (e.g., solid or liquid) that can be used or prepared as nourishment, including food and beverages. Foodstuff articles may serve a variety of purposes, such as cooking, baking, heating, storing, etc., and may include, for instance, beverage containers, food containers, cookware, bakeware, etc. In addition to possessing an aesthetically pleasing appearance similar to metal articles, the pearly luster appearance can also provide a signal to a user that the foodstuff article can be safely heated in an oven or stove.

Various embodiments of the present invention will now be described in further detail.

I. Polymer Composition

A. Liquid Crystalline Polymer

Liquid crystalline polymers are generally classified as "thermotropic" to the extent that they can possess a rod-like structure and exhibit a crystalline behavior in its molten state (e.g., thermotropic nematic state). Such polymers may be formed from one or more types of repeating units as is known in the art. The liquid crystalline polymer may, for example, contain one or more aromatic ester repeating units, typically in an amount of from about 60 mol. % to about 99.9 mol. %, in some embodiments from about 70 mol. % to about 99.5 mol. %, and in some embodiments, from about 80 mol. % to about 99 mol. % of the polymer. The aromatic ester repeating units may be generally represented by the following Formula (I):

wherein, ring B is a substituted or unsubstituted 6-membered aryl group (e.g., 1,4-phenylene or 1,3-phenylene), a substituted or unsubstituted 6-membered aryl group fused to a substituted or unsubstituted 5- or 6-membered aryl group (e.g., 2,6-naphthalene), or a substituted or unsubstituted 6-membered aryl group linked to a substituted or unsubstituted 5- or 6-membered aryl group (e.g., 4,4-biphenylene); and $Y_1$ and $Y_2$ are independently O, C(O), NH, C(O)HN, or NHC(O), wherein at least one of $Y_1$ and $Y_2$ are C(O).

Examples of aromatic ester repeating units that are suitable for use in the present invention may include, for instance, aromatic dicarboxylic repeating units ($Y_1$ and $Y_2$ in Formula I are C(O)), aromatic hydroxycarboxylic repeating units ($Y_1$ is O and $Y_2$ is C(O) in Formula I), as well as various combinations thereof.

Aromatic dicarboxylic repeating units, for instance, may be employed that are derived from aromatic dicarboxylic acids, such as terephthalic acid, isophthalic acid, 2,6-naphthalenedicarboxylic acid, diphenyl ether-4,4'-dicarboxylic acid, 1,6-naphthalenedicarboxylic acid, 2,7-naphthalenedicarboxylic acid, 4,4'-dicarboxybiphenyl, bis(4-carboxyphenyl)ether, bis(4-carboxyphenyl)butane, bis(4-carboxyphenyl)ethane, bis(3-carboxyphenyl)ether, bis(3-carboxyphenyl)ethane, etc., as well as alkyl, alkoxy, aryl and halogen substituents thereof, and combinations thereof. Particularly suitable aromatic dicarboxylic acids may include, for instance, terephthalic acid ("TA"), isophthalic acid ("IA"), and 2,6-naphthalenedicarboxylic acid ("NDA"). When employed, repeating units derived from aromatic dicarboxylic acids (e.g., IA, TA, and/or NDA) typically constitute from about 5 mol. % to about 60 mol. %, in some embodiments from about 10 mol. % to about 55 mol. %, and in some embodiments, from about 15 mol. % to about 50% of the polymer.

Aromatic hydroxycarboxylic repeating units may also be employed that are derived from aromatic hydroxycarboxylic acids, such as, 4-hydroxybenzoic acid; 4-hydroxy-4'-biphenylcarboxylic acid; 2-hydroxy-6-naphthoic acid; 2-hydroxy-5-naphthoic acid; 3-hydroxy-2-naphthoic acid; 2-hydroxy-3-naphthoic acid; 4'-hydroxyphenyl-4-benzoic acid; 3'-hydroxyphenyl-4-benzoic acid; 4'-hydroxyphenyl-3-benzoic acid, etc., as well as alkyl, alkoxy, aryl and halogen substituents thereof, and combination thereof. Particularly suitable aromatic hydroxycarboxylic acids are 4-hydroxybenzoic acid ("HBA") and 6-hydroxy-2-naphthoic acid ("HNA"). When employed, repeating units derived from hydroxycarboxylic acids (e.g., HBA and/or HNA) typically constitute from about 10 mol. % to about 85 mol. %, in some embodiments from about 20 mol. % to about 80 mol. %, and in some embodiments, from about 25 mol. % to about 75% of the polymer.

Other repeating units may also be employed in the polymer. In certain embodiments, for instance, repeating units may be employed that are derived from aromatic diols, such as hydroquinone, resorcinol, 2,6-dihydroxynaphthalene, 2,7-dihydroxynaphthalene, 1,6-dihydroxynaphthalene, 4,4'-dihydroxybiphenyl (or 4,4'-biphenol), 3,3'-dihydroxybiphenyl, 3,4'-dihydroxybiphenyl, 4,4'-dihydroxybiphenyl ether, bis(4-hydroxyphenyl)ethane, etc., as well as alkyl, alkoxy, aryl and halogen substituents thereof, and combinations thereof. Particularly suitable aromatic diols may include, for instance, hydroquinone ("HQ") and 4,4'-biphenol ("BP"). When employed, repeating units derived from aromatic diols (e.g., HQ and/or BP) typically constitute from about 1 mol. % to about 30 mol. %, in some embodiments from about 2 mol. % to about 25 mol. %, and in some embodiments, from about 5 mol. % to about 20% of the polymer. Repeating units may also be employed, such as those derived from aromatic amides (e.g., acetaminophen ("APAP")) and/or aromatic amines (e.g., 4-aminophenol ("AP"), 3-aminophenol, 1,4-phenylenediamine, 1,3-phenylenediamine, etc.). When employed, repeating units derived from aromatic amides (e.g., APAP) and/or aromatic amines (e.g., AP) typically constitute from about 0.1 mol. % to about 20 mol. %, in some embodiments from about 0.5 mol. % to about 15 mol. %, and in some embodiments, from about 1 mol. % to about 10% of the polymer. It should also be understood that various other monomeric repeating units may be incorporated into the polymer. For instance, in certain embodiments, the polymer may contain one or more repeating units derived from non-aromatic monomers, such as aliphatic or cycloaliphatic hydroxycarboxylic acids, dicarboxylic acids, diols, amides, amines, etc. Of course, in other embodiments, the polymer may be "wholly aromatic" in that it lacks repeating units derived from non-aromatic (e.g., aliphatic or cycloaliphatic) monomers.

In one particular embodiment, the liquid crystalline polymer may be formed from repeating units derived from 4-hydroxybenzoic acid ("HBA") and terephthalic acid ("TA") and/or isophthalic acid ("IA"), as well as various other optional constituents. The repeating units derived from 4-hydroxybenzoic acid ("HBA") may constitute from about 5 mol. % to about 70 mol. %, in some embodiments from about 10 mol. % to about 65 mol. %, and in some embodiments, from about 15 mol. % to about 50% of the polymer. The repeating units derived from terephthalic acid ("TA") and/or isophthalic acid ("IA") may likewise constitute from about 5 mol. % to about 40 mol. %, in some embodiments from about 10 mol. % to about 35 mol. %, and in some embodiments, from about 15 mol. % to about 35% of the polymer. Other possible repeating units may include those derived from 6-hydroxy-2-naphthoic acid ("HNA"), 2,6-naphthalenedicarboxylic acid ("NDA"), 4,4'-biphenol ("BP"), hydroquinone ("HQ"), and/or acetaminophen ("APAP"). In certain embodiments, for example, repeating units derived from HNA, NDA, BP, HQ, and/or APAP may each constitute from about 1 mol. % to about 35 mol. %, in some embodiments from about 2 mol. % to about 30 mol. %, and in some embodiments, from about 3 mol. % to about 25 mol. % when employed.

In another embodiment, the liquid crystalline polymer may be formed from repeating units derived from 4-hydroxybenzoic acid ("HBA"), 4'-biphenol ("BP") and/or hydroquinone ("HQ"), as well as various other optional constituents. The repeating units derived from 4-hydroxybenzoic acid ("HBA") may constitute from about 40 mol. % to about 85 mol. %, in some embodiments from about 50 mol. % to about 80 mol. %, and in some embodiments, from about 60 mol. % to about 75% of the polymer. The repeating units derived from 4'-biphenol ("BP") and/or hydroquinone ("HQ") may likewise constitute from about 5 mol. % to about 40 mol. %, in some embodiments from about 10 mol. % to about 35 mol. %, and in some embodiments, from about 15 mol. % to about 35% of the polymer. Other possible repeating units may include those derived from 6-hydroxy-2-naphthoic acid ("HNA"), 2,6-naphthalenedicarboxylic acid ("NDA"), terephthalic acid ("TA"), isophthalic acid ("IA"), and/or acetaminophen ("APAP"). In certain embodiments, for example, repeating units derived from HNA, NDA, IA, TA, and/or APAP may each constitute from about 1 mol. % to about 35 mol. %, in some embodiments from about 2 mol. % to about 30 mol. %, and in some embodiments, from about 3 mol. % to about 25 mol. % when employed.

Regardless of the particular constituents and nature of the polymer, the liquid crystalline polymer may be prepared by initially introducing the aromatic monomer(s) used to form the ester repeating units (e.g., aromatic hydroxycarboxylic acid, aromatic dicarboxylic acid, etc.) and/or other repeating units (e.g., aromatic diol, aromatic amide, aromatic amine, etc.) into a reactor vessel to initiate a polycondensation reaction. The particular conditions and steps employed in such reactions are well known, and may be described in more detail in U.S. Pat. No. 4,161,470 to Calundann; U.S. Pat. No. 5,616, 680 to Linstid, III, et al.; U.S. Pat. No. 6,114,492 to Linstid. III, et al.; U.S. Pat. No. 6,514,611 to Shepherd, et al.; and WO 2004/058851 to Waaaoner. The vessel employed for the reaction is not especially limited, although it is typically desired to employ one that is commonly used in reactions of high viscosity fluids. Examples of such a reaction vessel may include a stirring tank-type apparatus that has an agitator with a variably-shaped stirring blade, such as an anchor type, multistage type, spiral-ribbon type, screw shaft type, etc., or a modified shape thereof. Further examples of such a reaction vessel may include a mixing apparatus commonly used in resin kneading, such as a kneader, a roll mill, a Banbury mixer, etc.

If desired, the reaction may proceed through the acetylation of the monomers as known the art. This may be accomplished by adding an acetylating agent (e.g., acetic anhydride) to the monomers. Acetylation is generally initiated at temperatures of about 90° C. During the initial stage of the acetylation, reflux may be employed to maintain vapor phase temperature below the point at which acetic acid byproduct and anhydride begin to distill. Temperatures during acetylation typically range from between 90° C. to 150° C., and in some embodiments, from about 110° C. to about 150° C. If reflux is used, the vapor phase temperature typically exceeds the boiling point of acetic acid, but remains low enough to retain residual acetic anhydride. For example, acetic anhydride vaporizes at temperatures of about 140° C. Thus, providing the reactor with a vapor phase reflux at a temperature of from about 110° C. to about 130° C. is particularly desirable. To ensure substantially complete reaction, an excess amount of acetic anhydride may be employed. The amount of excess anhydride will vary depending upon the particular acetylation conditions employed, including the presence or absence of reflux. The use of an excess of from about 1 to about 10 mole percent of acetic anhydride, based on the total moles of reactant hydroxyl groups present is not uncommon.

Acetylation may occur in in a separate reactor vessel, or it may occur in situ within the polymerization reactor vessel. When separate reactor vessels are employed, one or more of the monomers may be introduced to the acetylation reactor and subsequently transferred to the polymerization reactor. Likewise, one or more of the monomers may also be directly introduced to the reactor vessel without undergoing pre-acetylation.

In addition to the monomers and optional acetylating agents, other components may also be included within the reaction mixture to help facilitate polymerization. For instance, a catalyst may be optionally employed, such as metal salt catalysts (e.g., magnesium acetate, tin(I) acetate, tetrabutyl titanate, lead acetate, sodium acetate, potassium acetate, etc.) and organic compound catalysts (e.g., N-methylimidazole). Such catalysts are typically used in amounts of from about 50 to about 500 parts per million based on the total weight of the recurring unit precursors. When separate reactors are employed, it is typically desired to apply the catalyst to the acetylation reactor rather than the polymerization reactor, although this is by no means a requirement.

The reaction mixture is generally heated to an elevated temperature within the polymerization reactor vessel to initiate melt polycondensation of the reactants. Polycondensation may occur, for instance, within a temperature range of from about 225° C. to about 400° C., in some embodiments from about 250° C. to about 395° C., and in some embodiments, from about 280° C. to about 380° C. For instance, one suitable technique for forming the liquid crystalline polymer may include charging precursor monomers and acetic anhydride into the reactor, heating the mixture to a temperature of from about 90° C. to about 150° C. to acetylize a hydroxyl group of the monomers (e.g., forming acetoxy), and then increasing the temperature to from about 225° C. to about 400° C. to carry out melt polycondensation. As the final polymerization temperatures are approached, volatile byproducts of the reaction (e.g., acetic acid) may also be removed so that the desired molecular weight may be readily achieved. The reaction mixture is generally subjected to agitation during polymerization to ensure good heat and mass transfer, and in turn, good material homogeneity. The rotational velocity of the agitator may vary during the course of the reaction, but typically ranges from about 10 to about 100 revolutions per minute ("rpm"), and in some embodiments, from about 20 to about 80 rpm. To build molecular weight in the melt, the polymerization reaction may also be conducted under vacuum, the application of which facilitates the removal of volatiles formed during the final stages of polycondensation. The vacuum may be created by the application of a suctional pressure, such as within the range of from about 5 to about 30 pounds per square inch ("psi"), and in some embodiments, from about 10 to about 20 psi.

Following melt polymerization, the molten polymer may be discharged from the reactor, typically through an extrusion orifice fitted with a die of desired configuration, cooled, and collected. Commonly, the melt is discharged through a perforated die to form strands that are taken up in a water bath, pelletized and dried. In some embodiments, the melt polymerized polymer may also be subjected to a subsequent solid-state polymerization method to further increase its molecular weight. Solid-state polymerization may be conducted in the presence of a gas (e.g., air, inert gas, etc.). Suitable inert gases may include, for instance, include nitrogen, helium, argon, neon, krypton, xenon, etc., as well as combinations thereof. The solid-state polymerization reactor vessel can be of virtually any design that will allow the polymer to be maintained at the desired solid-state polymerization temperature for the desired residence time. Examples of such vessels can be those that have a fixed bed, static bed, moving bed, fluidized bed, etc. The temperature at which solid-state polymerization is performed may vary, but is typically within a range of from about 250° C. to about 350° C. The polymerization time will of course vary based on the temperature and target molecular weight. In most cases, however, the solid-state polymerization time will be from about 2 to about 12 hours, and in some embodiments, from about 4 to about 10 hours.

The resulting liquid crystalline polymer may have a relatively high melting temperature. For example, the melting temperature of the polymer may be from about 225° C. to about 400° C., in some embodiments from about 250° C. to about 395° C., and in some embodiments, from about 280° C. to about 380° C. While having a relatively high melting temperature, the polymer can maintain a relatively low melt viscosity. The melt viscosity of the liquid crystalline polymer may, for instance, be about 250 Pa-s or less, in some embodiments about 150 Pa-s or less, and in some embodiments, from about 20 to about 125 Pa-s, determined at a shear rate of 1000 seconds$^{-1}$. Melt viscosity may be determined in accordance with ASTM Test No. 1238-70 at temperatures ranging from 320° C. to 370° C. depending on the melting temperature (e.g., 350° C. or 370° C.). The resulting liquid crystalline polymer may also have a high number average molecular weight ($M_n$) of about 2,000 grams per mole or more, in some embodiments from about 4,000 grams per mole or more, and in some embodiments, from about 5,000 to about 50,000 grams per mole. The intrinsic viscosity of the polymer, which is generally proportional to molecular weight, may also be relatively high. For example, the intrinsic viscosity may be about about 4 deciliters per gram ("dL/g") or more, in some embodiments about 5 dL/g or more, in some embodiments from about 6 to about 20 dL/g, and in some embodiments from about 7 to about 15 dL/g. Intrinsic viscosity may be determined in accordance with ISO-1628-5 using a 50/50 (v/v) mixture of pentafluorophenol and hexafluoroisopropanol, as described in more detail below.

B. Pearlescent Filler

The pearlescent filler of the polymer composition generally includes flake-shaped particles coated with at least one metal oxide layer. The flake-shaped particles may have a relatively high aspect ratio (e.g., average length or diameter divided by average thickness), such as about 4:1 or more, in some embodiments about 8:1 or more, and in some embodiments, from about 10:1 to about 2000:1. The average length or diameter of the particles may, for example, range from about 1 micrometer to about 100 micrometers, in some embodiments from about 2 micrometers to about 80 micrometers, and in some embodiments, from about 5 micrometers to about 60 micrometers. The average thickness may likewise be about 10 micrometers or less, in some embodiments from about 0.01 micrometers to about 8 micrometers, and in some embodiments, from about 0.05 micrometers to about 5 micrometers. The flake-shaped particles are formed from a natural and/or synthetic silicate mineral, such as mica, halloysite, kaolinite, illite, montmorillonite, vermiculite, palygorskite, pyrophyllite, calcium silicate, aluminum silicate, wollastonite, etc. Mica, for instance, is particularly suitable. Any form of mica may generally be employed, including, for instance, muscovite ($KAl_2(AlSi_3)O_{10}(OH)_2$), biotite ($K(Mg,Fe)_3(AlSi_3)O_{10}(OH)_2$), phlogopite ($KMg_3(AlSi_3)O_{10}(OH)_2$), lepidolite ($K(Li,Al)_{2-3}(AlSi_3)O_{10}(OH)_2$), glauconite ($(K,Na)(Al,Mg,Fe)_2(Si,Al)_4O_{10}(OH)_2$), etc.

Any type and number of metal oxide layers may generally be employed as a coating on the flake-shaped particles to help achieve the desired surface appearance. Suitable metal oxides for use in a layer may include, for instance, titanium dioxide ($TiO_2$), tin dioxide ($SnO_2$), iron oxide ($Fe_2O_3$), zirconium dioxide ($ZrO_2$), silicon dioxide ($SiO_2$), aluminum oxide ($Al_2O_3$), magnesium oxide (MgO), manganese dioxide ($MnO_2$), etc., as well as mixtures thereof. In certain embodiments, for example, the particles are coated with a first layer of titanium dioxide (e.g., anatase or rutile) and a second layer of iron oxide that overlies the first layer, or a first layer of iron oxide and a second layer of titanium dioxide (e.g., anatase or rutile) that overlies the first layer.

Titanium dioxide may be precipitated on the particles using any known technique, such as by adding a titanyl sulfate solution to a particle (e.g., mica) suspension and then inducing hydrolysis. Through such a method, the layer thickness and the associated color may be determined by the amount of titanyl sulfate present. If desired, a tin salt may be present in the particle suspension and hydrolyzed together with the titanyl sulfate to form tin dioxide, which can alter the anatase structure of titanium dioxide to a rutile structure and thereby improve luster and weatherability. Alternatively, a separate tin dioxide layer may be formed that overlies the titanium dioxide layer and is positioned between the titanium dioxide and iron oxide layers, or overlies both the titanium dioxide and iron oxide layers. The iron oxide layer may also be precipitated using any known method. Iron (III) and/or iron (II) salts may be employed. Precipitation of the iron oxide layer can be effected not only onto a calcined and, hence, already rutilized titanium dioxide layer, but also directly after the precipitation of the titanium dioxide onto the uncalcined pigment. In the latter case, the subsequent calcination may be accompanied by a very low diffusion of the iron into the titanium dioxide layer. Of course, a small amount of iron oxide can sometimes diffuse into the titanium dioxide layer and form pseudobrookite. In such embodiments, a 3-layer structure of titanium dioxide/pseudobrookite/iron oxide may be produced. If desired, it is also possible to incorporate a variety of dopants, such as other colored or colorless metal oxides, in the metal oxide layers. Suitable dopants include, for instance, compounds of aluminum(III), silicon(IV), zirconium(IV), chromium(III), boron(III) and phosphorus(V).

Regardless of the particular manner in which it is formed, the relative concentration of the pearlescent filler may be selectively controlled in the present invention to achieve the desired appearance without adversely impacting the thermal and mechanical properties of the polymer composition. In this regard, the pearlescent filler is typically employed in an amount of from about 5 wt. % to about 50 wt. %, in some embodiments from about 10 wt. % to about 40 wt. %, and in some embodiments, from about 20 wt. % to about 30 wt. %, based on the weight of liquid crystalline polymers employed in the composition. Liquid crystalline polymers may likewise constitute from about 50 wt. % to about 95 wt. %, in some embodiments from about 60 wt. % to about 90 wt. %, and in some embodiments, from about 70 wt. % to about 80 wt. % of the polymer composition.

C. Other Additives

Besides the components noted above, the polymer composition may also employ one or more other additives. Examples of such additives may include, for instance, antioxidants, UV stabilizers, light stabilizers, surfactants, flow promoters, fillers, antimicrobials, and other materials added to enhance properties and processibility. For example, additional mineral fillers may be employed to even further enhance strength. For instance, clay minerals may be employed, such as talc. In lieu of, or in addition to, clay minerals, other mineral fillers may also be employed, such as diatomaceous earth, alumina, silica, titanium dioxide, calcium carbonate, and so forth. Fibrous fillers may also be employed. Examples of such fibrous fillers may include those formed from carbon, glass, ceramics (e.g., alumina or silica), aramids (e.g., Kevlar® marketed by E. I. DuPont de Nemours, Wilmington, Del.), polyolefins, polyesters, etc., as well as mixtures thereof. Glass fibers are particularly suitable, such as E-glass, A-glass, C-glass, D-glass, AR-glass, R-glass, S1-glass, S2-glass, etc., and mixtures thereof.

II. Blending

The liquid crystalline polymer, pearlescent filler, and other optional additives may be blended together in a variety of ways to achieve the desired polymer composition. In certain embodiments, for example, the pearlescent filler may initially be formed as a masterbatch, and thereafter combined with the liquid crystalline polymer. Alternatively, the individual components of the composition may also be blended together without first forming a masterbatch. Regardless of how they are supplied, the components of the polymer composition are generally blended together to form the polymer composition. Blending may occur at a temperature at or near the melting temperature of the liquid crystalline polymer, such as at a temperature of from about 225° C. to about 400° C., in some embodiments, from about 250° C. to about 395° C., and in some embodiments, from about 280° C. to about 380° C. Any of a variety of melt blending techniques may generally be employed in the present invention. For example, the components may be melt blended within an extruder that includes at least one screw rotatably mounted and received within a barrel (e.g., cylindrical barrel). The extruder may be a single screw or twin screw extruder. If desired, one or more distributive and/or dispersive mixing elements may be employed within the mixing and/or melting sections of the extruder. Suitable distributive mixers for single screw extruders may include, for instance, Saxon, Dulmage, Cavity Transfer mixers, etc. Likewise, suitable dispersive mixers may include Blister ring, Leroy/Maddock, CRD mixers, etc. As is well known in the art, the mixing may be further improved by using pins in the barrel that create a folding and reorientation of the polymer melt, such as those used in Buss Kneader extruders, Cavity Transfer mixers, and Vortex Intermeshing Pin mixers.

III. Applications

Once formed, the resulting polymer composition may be shaped into any of a variety of different parts using techniques as is known in the art, such as injection molding, compression molding, blow molding, thermoforming, etc. For example, the parts may be molded using a one-component injection molding process in which dried and preheated plastic granules are injected into the mold. Regardless of the shaping technique employed, it has been discovered that the resulting parts may exhibit a pearly luster. The luster may be characterized in a variety of different ways. For example, the surface may exhibit a specular gloss of about 10 gloss units or more, in some embodiments about 30 gloss units or more, in some embodiments about 45 gloss units or more, in some embodiments 50 gloss units or more, and in some embodiments, about 55 gloss units or more, as determined in accordance with ASTM D523-08 at a 60° angle using a gloss meter. The part may also have a brownish or yellowish color similar to many metals, such as those made from bronze, brass, copper, gold, etc. This similarity in color can be quantified by measuring the absorbance with an optical reader in accordance with a standard test methodology known as "CIELAB", which is described in Pocket Guide to Digital Printing by F. Cost, Delmar Publishers, Albany, N.Y. ISBN 0-8273-7592-1 at pages 144 and 145 and "Photoelectric color difference meter", Journal of Optical Society of America, volume 48, page numbers 985-995, S. Hunter, (1958), both of which are incorporated herein by reference in their entirety. More specifically, the CIELAB test method defines three "Hunter" scale values, $L^*$, $a^*$, and $b^*$, which correspond to three characteristics of a perceived color based on the opponent theory of color perception and are defined as follows:

$L^*$=Lightness (or luminosity), ranging from 0 to 100, where 0=dark and 100=light;

$a^*$=Red/green axis, ranging from −100 to 100; positive values are reddish and negative values are greenish; and $b^*$=Yellow/blue axis, ranging from −100 to 100; positive values are yellowish and negative values are bluish.

Because CIELAB color space is somewhat visually uniform, a single number may be calculated that represents the total absolute color difference between two colors as perceived by a human using the following equation:

$$\Delta E = [(\Delta L^*)^2 + (\Delta a^*)^2 + (\Delta b^*)^2]^{1/2}$$

wherein, $\Delta L^*$ is the luminosity value of a first color subtracted from the luminosity value of a second color, $\Delta a^*$ is the red/green axis value of the first color subtracted from the red/green axis value of the second color; and $\Delta b^*$ is the yellow/blue axis value of the first color subtracted from the yellow/blue axis value of the second color. In CIELAB color space, each $\Delta E$ unit is approximately equal to a "just noticeable" difference between two colors and is therefore a good measure for an objective device-independent color specification system that may be used for the purpose of expressing differences in color. For instance, the "first color" in the formula above may represent the color of a metal part (e.g., copper) and the "second color" may represent the color of the polymer composition and/or a shaped part formed therefrom. Due to the relatively close color between parts formed from the polymer composition of the present invention and those formed from metal, the resulting $\Delta E$ values are typically small, such as about 12 or less, in some embodiments about 11 or less, in some embodiments, from about 0.5 to about 8, and in some embodiments, from about 1 to about 6.

Figure 3:
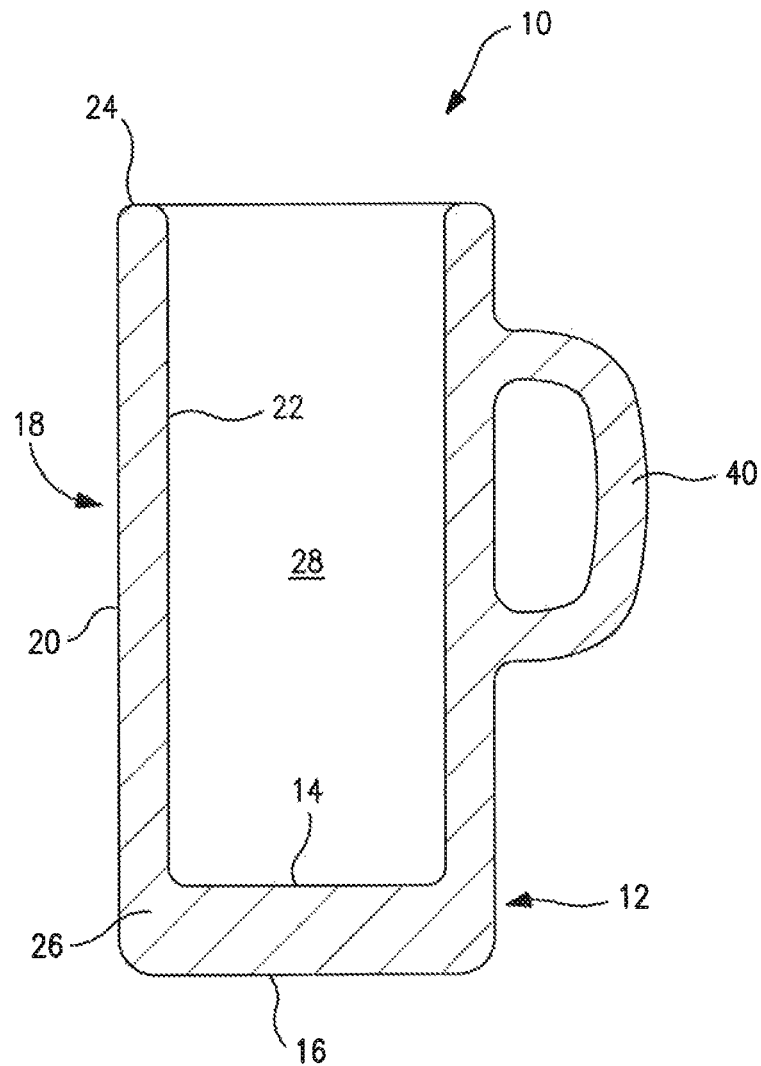
FIG. 3 is a cross-sectional view of one embodiment of a foodstuff article in the form of a mug, all or a portion of which may be formed from the polymer composition of the present invention.

Various different types of articles may be made from shaped parts and/or polymer compositions of the present invention. Although any suitable shaped part can be formed, the polymer composition of the present invention is particularly well suited for producing foodstuff articles, such as noted above. Referring to FIG. 3, for instance, one particular embodiment of a foodstuff article that may be formed in accordance with the present invention is shown in the shape of a mug 10. As illustrated, the mug 10 has a bottom wall 12, sidewall 18, and a handle 40. The bottom wall 12 defines an interior surface 14 and an exterior surface 16 and the sidewall 18 likewise defines an exterior surface 20 and an interior surface 22, as well as a top open end 24 and a bottom closed end 26. The sidewall 18 extends from the top open end 24 to the bottom closed end 26 where it is connected to the bottom wall 12 and defines a hollow interior 28 for receiving a beverage. In one embodiment, the mug 10, including sidewall 18 and bottom wall 12, are generally cylindrical in shape. Any portion of the mug 10 may generally be formed from the polymer composition of the present invention, such as the bottom wall 12, sidewall 18, and/or handle 40. In some embodiments, the entire mug is formed from the polymer composition of the present invention so that it has a pearly luster.

Figure 2:
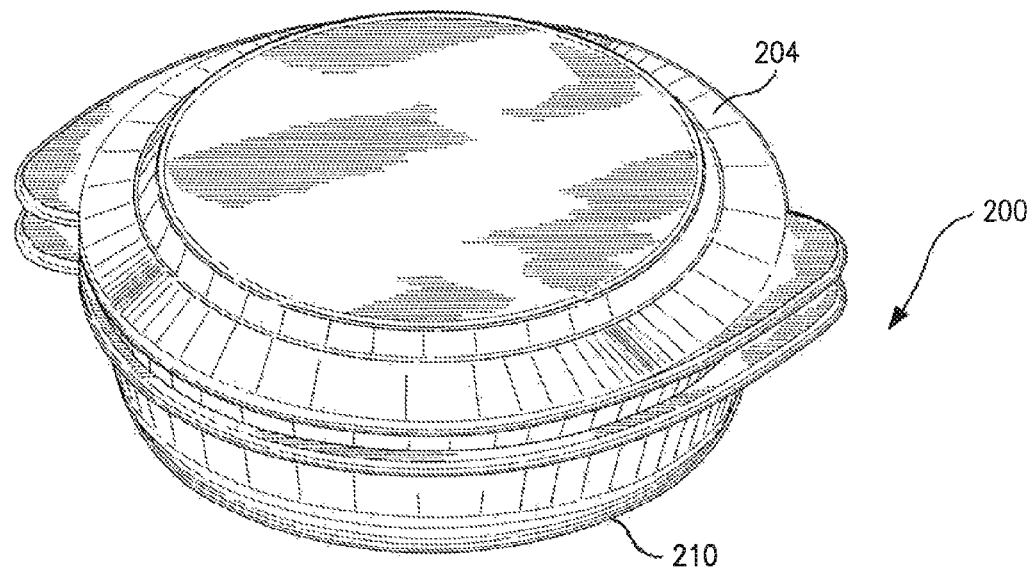
FIG. 2 is a perspective view of one embodiment of a foodstuff article in the form of a cooking container, all or a portion of which may be formed from the polymer composition of the present invention.

Foodstuff articles used for food preparation, such as cookware and bakeware, are also particularly well adapted for use with a shaped part formed from the polymer composition of the present invention. The polymer composition of the present invention may, for instance, be used to produce all or a portion of cookware (e.g., cooking utensils, beverage containers, braising pans, roasting pans, casserole pans, dutch ovens, frying pans, skillets, wonder pots, griddles, saucepans, sauté pans, stockpots, woks, etc.) and/or bakeware (e.g., cake pan, sheet pan, cookie sheet, jelly-roll pan, muffin pan, pie pan, bun pan, bread pan, etc.). When formed from the polymer composition of the present invention, such articles can be capable of withstanding high temperatures and also be chemical resistant and exceptionally inert. In certain embodiments, for example, the polymer composition of the present invention may be used to form a handle, cover, or lid of cookware or bakeware. Alternatively, the polymer composition may be used to form a cooking surface of the cookware or bakeware. Referring to FIG. 1, for instance, one embodiment of cookware 10 is shown that contains a handle 12 connected to a cooking vessel 15. If desired, the polymer composition of the present invention may be used to form all or a portion of the handle 12 and/or vessel 15. In the embodiment illustrated in FIG. 1, the cookware is in the form of a saucepan; however, it should be understood that a wide variety of other cookware articles may also be employed. Referring to FIG. 2, for instance, a cooking container 200 is shown that contains a lid 204 that is configured to be disposed over a base 210. Once again, as noted above, the polymer composition of the present invention may be used to form all or a portion of the lid 204 and/or the base 210.

The present invention may be better understood with reference to the following examples.

Example 1

Liquid crystalline polymer samples are formed from a pearlescent filler, which is either Iriodin™ 303 Royal Gold (mica with an average size of 10 to 60 micrometers) or Iriodin™ 522 Red-Brown Satin (mica with an average size of 5 to 25 micrometers). The compositions are set forth below in Table 1.

TABLE 1

| Sample | 1 | 2 | 3 |
|---|---|---|---|
| Vectra ® E950iSX | 80.0 | 80.0 | 80.0 |
| Iriodin ™ 303 Royal Gold | 20.0 | — | 15.0 |
| Iriodin ™ 522 Red-Brown Satin | — | 20.0 | 5.0 |
| Color | Brass | Copper | Bronze |

What is claimed is:

1. A liquid crystalline polymer composition that has a pearly luster, wherein the polymer composition comprises a liquid crystalline polymer in an amount of from about 50 wt. % to about 95 wt. % and a pearlescent filler, wherein the pearlescent filler includes flake-shaped silicate mineral particles coated with a metal oxide layer.

2. The liquid crystalline polymer composition of claim 1, wherein the liquid crystalline polymer contains repeating units derived from an aromatic dicarboxylic acid, an aromatic hydroxycarboxylic acid, or a combination thereof.

3. The liquid crystalline polymer composition of claim 1, wherein the polymer further comprises one or more repeating units derived from an aromatic diol, an aromatic amide, an aromatic amine, or a combination thereof.

4. The liquid crystalline polymer composition of claim 1, wherein the liquid crystalline polymer is wholly aromatic.

5. The liquid crystalline polymer composition of claim 1, wherein the particles have an aspect ratio of about 4:1 or more.

6. The liquid crystalline polymer composition of claim 1, wherein the particles have an average length of from about 1 to about 100 micrometers.

7. The liquid crystalline polymer composition of claim 1, wherein the particles include mica.

8. The liquid crystalline polymer composition of claim 1, wherein the metal oxide layer includes titanium dioxide, tin dioxide, iron oxide, zirconium dioxide, silicon dioxide, aluminum oxide, magnesium oxide, manganese dioxide, or a combination thereof.

9. The liquid crystalline polymer composition of claim 1, wherein the particles are coated with a titanium dioxide layer.

10. The liquid crystalline polymer composition of claim 1, wherein the particles are coated with a first metal oxide layer and a second metal oxide layer that overlies the first metal oxide layer.

11. The liquid crystalline polymer composition of claim 10, wherein the first metal oxide layer includes titanium dioxide and the second metal oxide layer contains iron oxide.

12. The liquid crystalline polymer composition of claim 11, further comprising a tin oxide layer.

13. The liquid crystalline polymer composition of claim 1, wherein the pearlescent filler is present in an amount of from about 5 wt. % to about 50 wt. % based on the weight of liquid crystalline polymers in the composition.

14. The liquid crystalline polymer composition of claim 1, wherein liquid crystalline polymers constitute from about 60 wt. % to about 90 wt. % of the polymer composition.

15. A molded part that defines a surface with a pearly luster, wherein the part comprises the liquid crystalline polymer composition of claim 1.

16. The molded part of claim 15, wherein the surface has a first color and a metal has a second color, wherein the difference between the first color and the second color is about 12 or less as determined by the CIELAB test and represented by ΔE in the following equation:

$$\Delta E = [(\Delta L^*)^2 + (\Delta a^*)^2 + (\Delta b^*)^2]^{1/2}$$

wherein,

ΔL* is the luminosity value L* of the first color subtracted from the luminosity value L* of the second color, wherein L* ranges from 0 to 100, where 0=dark and 100=light;

Δa* is the red/green axis value at of the first color subtracted from the red/green axis value a* of the second color, wherein at ranges from −100 to 100, and where positive values are reddish and negative values are greenish; and Δb* is the yellow/blue axis value b* of the first color subtracted from the yellow/blue axis value b* of the second color, wherein b* ranges from −100 to 100, and where positive values are yellowish and negative values are bluish.

17. The molded part of claim 16, wherein the metal is copper.

18. The molded part of claim 15, wherein the part is injection molded.

19. A cookware article comprising the molded part of claim 15.

20. The cookware article of claim 19, wherein the article is a cooking utensil, beverage container, food tray, food container, cake pan, pie pan, cooking tray, bun pan, cooking pan, muffin pan, or bread pan.

* * * * *